United States Patent [19]
Schill

[11] Patent Number: 5,909,882
[45] Date of Patent: Jun. 8, 1999

[54] PNEUMATIC DRIVEN AUTOMATIC CHUCK

[75] Inventor: Albrecht Paul Schill, Stockholm, Sweden

[73] Assignee: System 3R International AB, Vallingby, Sweden

[21] Appl. No.: 08/986,239

[22] Filed: Dec. 5, 1997

[30] Foreign Application Priority Data

Dec. 6, 1996 [EP] European Pat. Off. .............. 96119625

[51] Int. Cl.⁶ ............................ B23B 31/30; B23B 31/22
[52] U.S. Cl. ...................... 279/4.04; 279/4.12; 279/157; 219/69.15; 901/37; 409/234; 82/160
[58] Field of Search .................. 279/4.04, 4.12, 279/157, 4.01, 4.06; 219/69.15; 901/37; 409/232, 234; 82/160

[56] References Cited

U.S. PATENT DOCUMENTS

| | | | |
|---|---|---|---|
| 4,652,203 | 3/1987 | Nakashima et al. | 414/730 |
| 4,745,674 | 5/1988 | Abe et al. | 279/4.06 |
| 4,855,558 | 8/1989 | Ramsbro | 219/69.15 |
| 5,791,803 | 8/1998 | Nordquist | 403/13 |

*Primary Examiner*—Steven C. Bishop
*Attorney, Agent, or Firm*—Jacobson, Price, Holman & Stern, PLLC

[57] ABSTRACT

A pneumatically driven chuck for clamping and unclamping a tool holder of a machine tool, especially an electric discharge machine, said chuck including a mechanical clamp for clamping said tool holder, a first air chamber for receiving opening air for releasing said mechanical clamp, a second air chamber for receiving cleaning air to provide pneumatic clamping of said tool holder, and a release valve in pneumatic communication with said first and second air chambers to release cleaning air pressure from said second air chamber when opening air is provided to said first chamber. The pneumatically driven chuck may replace a spring driven chuck without any change in the control or in the program of the EDM.

10 Claims, 5 Drawing Sheets

PNEUMATIC DRIVEN AUTOMATIC CHUCK

FIELD OF THE INVENTION

The invention relates to pneumatic driven or controlled automatic chucks. Such chucks are primarily used in electrical discharge machinig machines (EDM machines). A pneumatic driven automatic chuck, as defined herein, is a chuck provided with a special air chamber that generates an additional clamping force upon a draw bar that is coupled to a workpiece. The basic clamping force is provided by springs. The additional clamping force provides for greater rigidity in the connection between the chuck and the workpiece, via the workpiece draw bar.

DESCRIPTION OF THE RELATED ART

Electrical discharge machines typically include a chuck for connecting a workpiece thereto. An example for a workpiece in a tool holder which holds a tool for EDM machining connected therewith and the tool holder is clamped to the chuck generally through a centrally located draw bar, one end of wich is coupled to the tool holder. The draw bar is inserted into the chuck and is clamped therein during the machining operation and then released. The upper surface of the tool holder engages with the chuck and this upper surface includes reference surfaces that engage with corresponding reference surfaces on the chuck to assure accurate positioning in the X, Y and Z directions.

At least two different types of chucks for EDM machines are known in the art, a spring driven chuck and a pneumatic driven chuck. The spring driven chuck provides for the clamping of the tool holder, via a draw bar, solely by a mechanical spring that is biased to lock or retain the draw bar in the chuck. No other clamping force is provided. The spring driven chuck opens by providing an opening air pressure to the chuck which operates against a piston and against the bias of the spring to open the chuck and enable the draw bar to be released. Similarly, when the draw bar is to be inserted, the opening air pressure is provided to the chuck against the bias of the spring to enable insertion of the draw bar; the opening air pressure is then released and the spring bias clamps the draw bar to the chuck. The spring driven chuck is also coupled to a cleaning air supply source for supplying cleaning air. This cleaning air is lead to the reference surfaces between the chuck and the holder. As the holder leaves the chuck, the cleaning air flushes along the reference surfaces and cleans the surfaces from dust and particles. Cleaning is conducted also at the time of clamping of the holder to the chuck.

EDM machines are provided with pneumatic or air control systems, controlled by software for example, for controlling the timing of the opening air pressure and cleaning air pressure supplied to the spring driven chuck. As shown in FIG. 1, the opening sequence for opening a spring driven chuck is provided. As can be seen, when the tool holder is clamped to the chuck the opening air pressure and cleaning air pressure are zero, i.e., no air pressure is provided to the chuck initially. The cleaning air is turned on first, followed by the switching on of the opening air which acts on the piston againt the bias of the spring which then results in movement of the tool holder and an opening of the cleaning holes, thus resulting in a drop in pressure of the cleaning air. There is also provided a clamp/unclamp detection which is a safety function to check that the holder has actually left the chuck after unclamping. When the holder has completely left the chuck after unclamping then the cleaning air pressure drops due to the uncovered cleaning holes. Ultimately, the cleaning air pressure is switched off entirely. The opening air pressure may remain on for a predetermined time but it too will ultimately be switched off until the draw bar of the tool holder is again inserted into the chuck.

A pneumatic driven automatic chuck is also known in the art and, as discussed above, includes an additional air chamber provided at the underside of the piston to generate an additional clamping force along with the clamping force of the spring. A pneumatic driven automatic chuck is described in U.S. Pat. No. 4,855,558, inventor Ramsbro, and assigned to the same assignee as the present invention and incorporated by reference herein. The additional clamping force is provided in said chuck by the cleaning air pressure which is switched ON at proper times. There are tool reference systems which include axially elastic elements engaging reference counterelements of the chuck upon clamping. Such elastic elements assist in unclamping the draw bar. Other tool reference systems are not equipped with such axially elastic elements. For unclamping thus a greater opening air pressure is required than for a tool reference system which does have such elastic elements. Otherwise a special design of the program running the EDM is necessary which allows the cleaning air pressure first to switch off, i.e. to have no air pressure in the additional air chamber when opening the chuck.

The use of special software for a pneumatic driven automatic chuck is undesirable. Many EDM machines already in service have software for controlling only spring force driven chucks which software provides an opening sequence as shown in FIG. 1. In many cases, it is desirable to substitute a spring driven chuck with a pneumatic driven chuck without changing the air control software with special software. It is a solution to this problem to which the present invention relates.

BRIEF SUMMARY OF THE INVENTION

The present invention relates to a new pneumatic driven automatic chuck that may be substituted for a spring driven chuck without providing any special pneumatic air control software. That is, the novel pneumatic automatic chuck of the present invention can be used with the conventional pneumatic control software utilized for spring driven chucks. The novel pneumatic driven automatic chuck of the present invention includes a release valve that automatically closes the cleaning air supply to the additional clamping chamber to disable any pneumatic counteracting force against the force of the opening air.

It is an object of the present invention to provide a pneumatically driven chuck that has full compatibility or interchangeability with a spring driven chuck without requiring any special pneumatic air control software.

It is a further object of the invention to provide a pneumatically driven chuck with a release valve for automatically reducing or eliminating the additional clamping force to enable opening of the chuck and release of the tool holder draw bar.

Still further, it is an object of the present invention to provide a pneumatically driven automatic chuck with a release valve and with an additional closing valve for closing cleaning air outlets of the chuck which are left uncovered after clamping of a tool. This leads to the advantage that the air pressure which is led to the additional air chamber is higher due to the closing of the closing valve. The pneumatic clamping force is thus higher.

These and other objects of the invention will be apparent when reference is made to the following detailed description and the accompanied drawings.

BRIEF DESCRIPTION OF THE DRAWINGS

The invention is described hereinafter in detail with reference to the accomapanying drawings of which illustrate FIG. 1 a diagram of air pressure (bar) versus time (sec) for showing the opening sequence of a spring driven chuck.

DETAILED DESCRIPTION OF PREFERRED EMBODIMENTS

Figure 1:
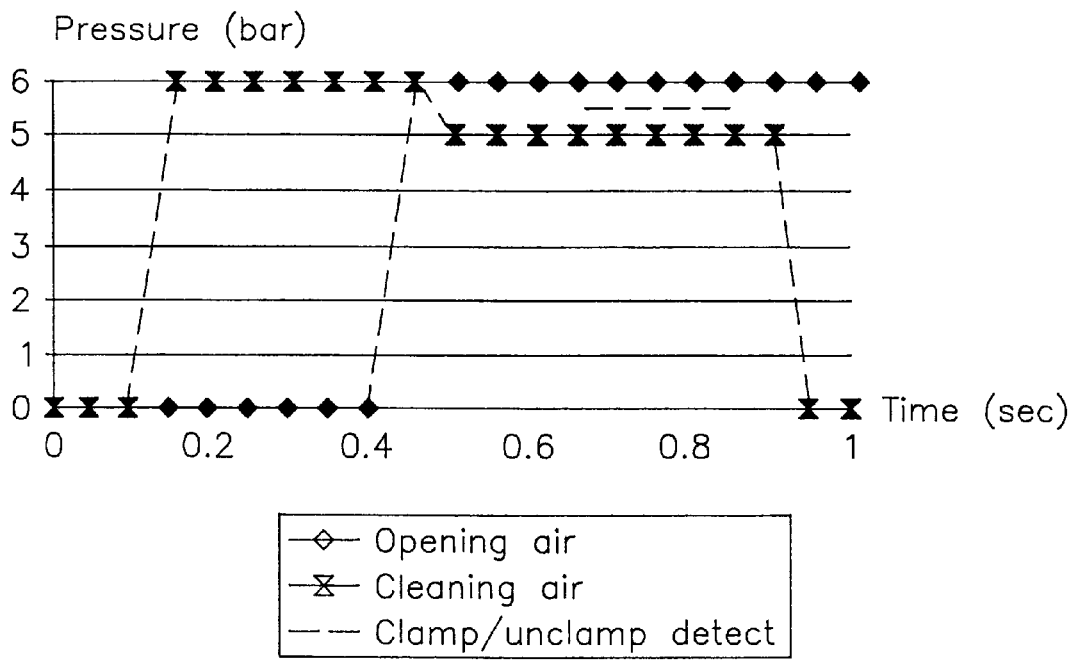

As specifically explained in the document U.S. Pat. No. 4,855,588 the chuck is formed from an upper part 21 to which a cuplike lower part 23 is bolted. Within the lower part 23 and around a central upright tube 25 formed from the lower part 23 a ring chamber is provided within which a ring piston 24 is accommodated. The axialy extending inner ring surface of the piston 24 sealingly engages an outer surface of the tube 25 and the axially extending outer ring surface of the piston 24 sealingly engages an iner surface of the lower part 23 thereby dividing the ringchamber to an upper opening air chamber 27 and a lower cleaning air chamber 26 for higher clamping forces.

Figure 2:
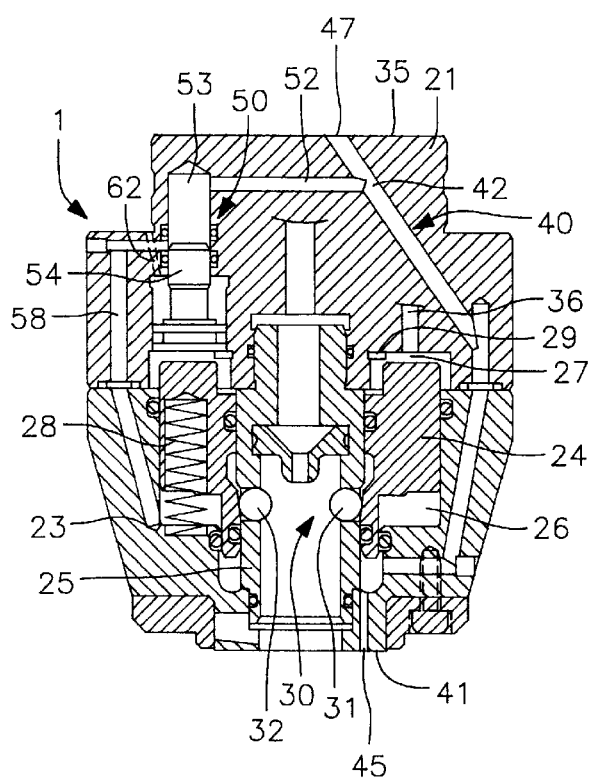
FIG. 2 an axial cross section of a chuck incorporating the invention.

The tube 25 is equipped with a ring of radially movable clamping balls 31, 32 which form a clamping means 30 for clamping a drawbar (not shown) inserted axially into the tube 25. By a number of equally spaced compression springs 28 (only one spring is shown) piston 24 is urged axially upwardly for activating the clamping means 30 (FIG. 2). When the opening air chamber 27 is loaded by opening air pressure of sufficient magnitude the piston 24 will move axially downwardly against the force developped by the compression springs 28 thereby deactivating the clamping means 30. Deactivated clamping means 30 allow the drawbar to be withdrawn axially from the chuck 1. For further details see the above mentioned document.

An opening air channel 36 is provided within the body of the upper part 21 the input aperture 37 of which is found within the free upper surface 35 of the upper part 21. Through aperture 37 channel 36 may be coupled to a (not shown) opening air pressure source. Channel 36 opens into opening air chamber 27 for loading it with opening air pressure during periods of time when it is ON.

A manifold 40 of cleaning air conduits is provided for within the body of the upper part 21 and within the lateral walls of lower part 23. An aperture 47 in the upper surface 35 forms the input for cleaning air into the manifold 40 which may be coupled to a (not shown) cleaning air pressure source. Clearly, the opening air pressure source and the cleaning air pressure source may be realized by one single air pressure source which is controlled by a (not shown) central control of the electric discharge machine for turning ON opening air pressure within channel 36 during programmatically preset periods of time and for turning ON cleaning air pressure within manifold 40 also during programmatically preset periods of time (see FIG. 1).

Manifold 40 comprises a channel 42 which extends through the upper and the lower part towards a cleaning air aperture 45 within a reference surface 41 of chuck 1. During the time a workpiece, e.g. an electrode holder (not shown) is clamped to chuck 1 it abuts reference surface 41 and thereby closes aperture 45.

Figure 3:
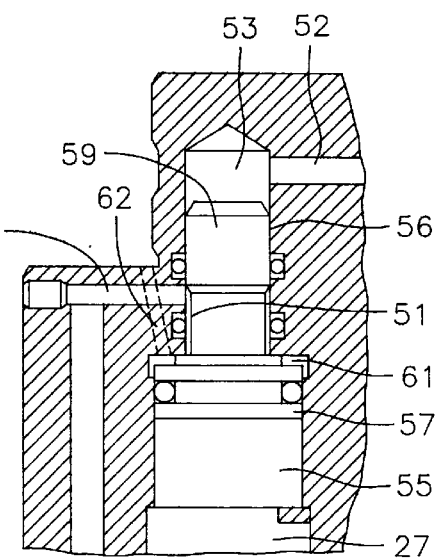
FIG. 3 a release valve in enlarged scale as built in the chuck of FIG. 2.
Figure 4:
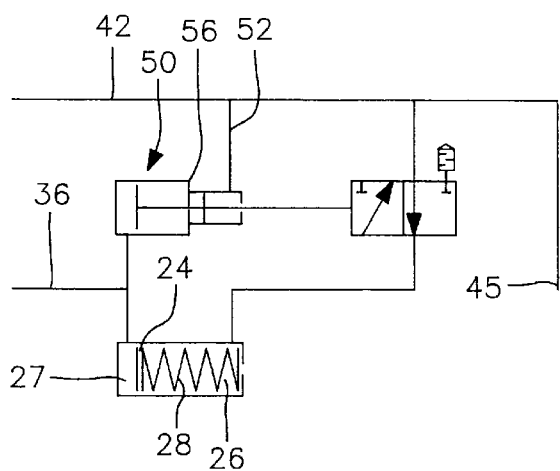
FIG. 4 a pneumatical functional diagram of the chuck of FIG. 2.
Figure 5:
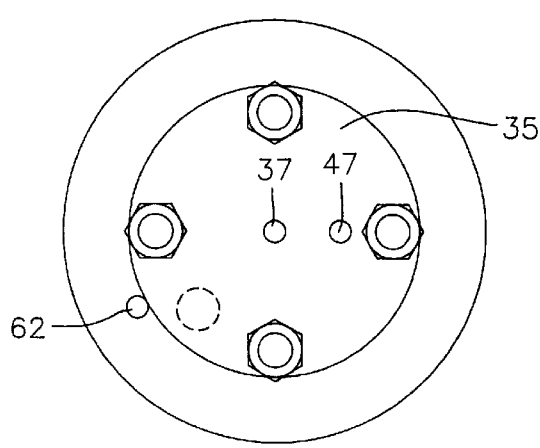
FIG. 5 a plan view on the chuck according to FIG. 2.

A branchline 52 from channel 42 leads to a first release piston chamber 53 of a release valve 50 built in the body of upper part 21. Release valve 50 comprises a release piston 54 which may move between an upper end position (FIG. 3) and a lower end position (FIG. 2) within an axially extending stepped cylinder 56 forming said first release piston chamber 53 and a second release piston chamber 55 of greater radial width than the first release piston chamber 53. The second release piston chamber 55 is open to the opening air chamber 27. The base 57 of the release piston 54 accomodated within second release piston chamber 55 has therefore a greater radial effective area than the head 59 of release piston 54 which extends into the first release piston chamber 53.

When release piston 54 assumes its lower end position branch line 52 communicates with the cleaning air chamber 26 through the first release piston chamber 53 and a further channel 58 of manifold 40 connecting first release piston chamber 53 to chamber 26. When release piston 54 assumes the upper end position of its way of travel the communication of branch line 52 with channel 58 is interrupted. Instead, channel 58 and thus chamber 26 are vented: A portion of head 59 adjoining the base 57 has a radial and axial incut forming a slot 51 which communicates at one end with channel 58 and at the opposite end with a section 61 of the second release piston chamber 55 air tight sealed from opening air chamber 27 by base 57 of release piston 54. Chamber section 61 communicates with free outside air through a channel 62 shown in FIGS. 2 and 3 by dashed lines.

Figure 6:
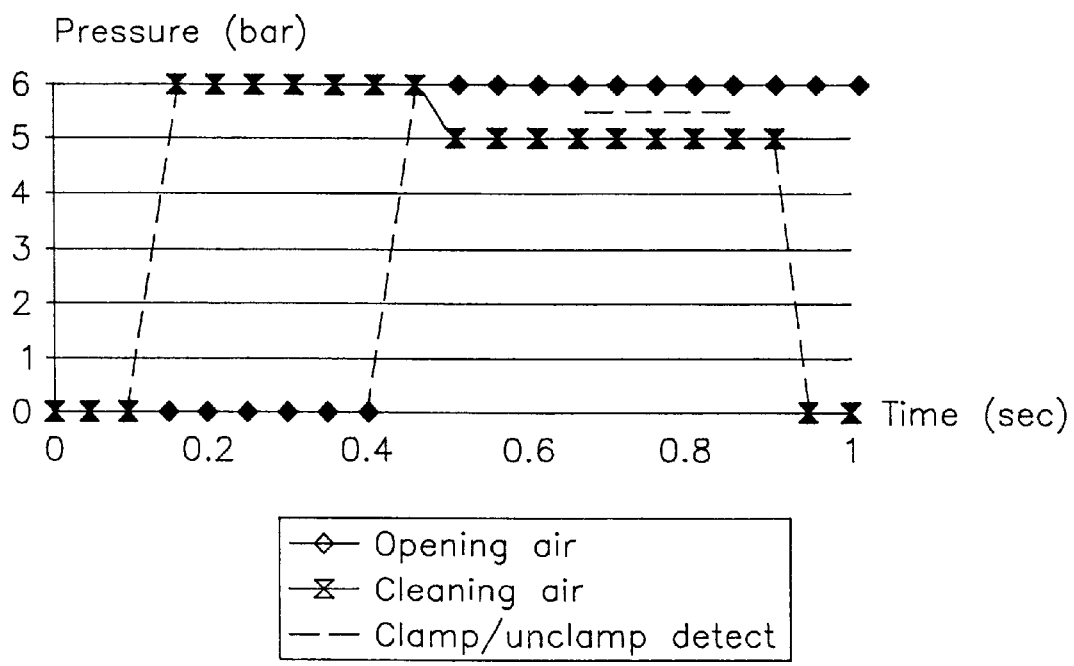
FIG. 6 a diagram of air pressure in bar versus time in sec for showing the opening sequence of the chuck according to FIG. 2.

Assuming chuck 1 is clamping a workpiece and consequently aperture 45 is closed. Release piston 54 stands in its lower end position. The opening air pressure P 36 (i.e. the pressure P within channel 36) and the cleaning air pressure P 42 are switched OFF. The electric discharge machine has finished the work. For releasing the workpiece from the chuck 1 the following steps are performed (see FIG. 6):

1) Cleaning air pressure P 42 is switched ON. The clamping force developed by spring 28 is augmented by P 42.

2) 0.3 sec later opening air pressure P 36 is switched ON. Release piston 54 moves upwardly to its upper end position and thereby interrupts communication of branch line 52 and chamber 26 and vents chamber 26 through channel 62. When P 26 falls towards zero P 36 surmounts the clamping force of springs 28, the clamping means 30 become deactivated.

3) When withdrawing the draw bar from tube 25 and thereby removing the work piece from chuck 1 aperture 45 becomes uncovered. For a short period of time of approximately 0.5 sec the magnitude of P 42 falls down to a value which allows the control to verify that the workpiece actually has been removed from the chuck 1. Such verification is implemented by a comparison of said value to a preset pressure value (dashed line in FIG. 6). If the result of the comparison has confirmed withdrawal of the workpiece P 42 is switched OFF while P 36 is till ON for allowing insert of another draw bar into the chuck 1.

Figure 7:
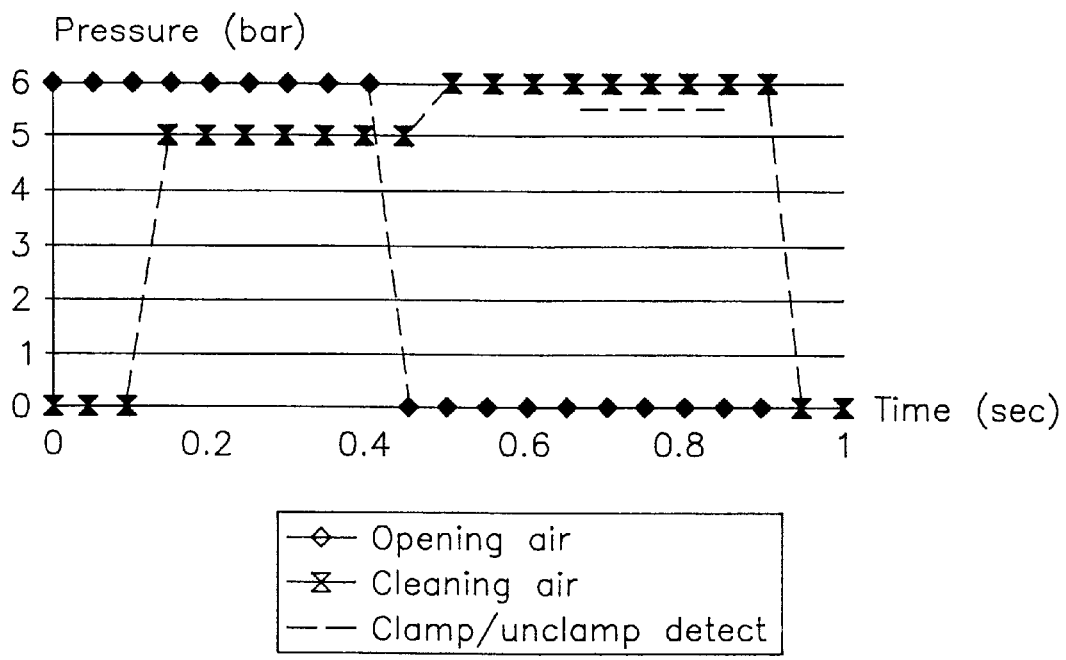
FIG. 7 a diagram similar to FIG. 6 for showing the closing sequence.

The closing sequence, i.e. clamping a workpiece is as follows (FIG. 7):

4) P 36 is still ON and P 42 is switched ON. Piston 24 is in its lower end position and release piston 54 remain in its upper end position.

5) Means (not shown) transmit a signal to the control when the workpiece is completely fed into the tube 25. As a response to said signal the control switches P 36 OFF. Piston 24 moves to its upper end position allowing the clamping means 30 to clamp the draw bar. Aperture 45 becomes covered so that P 42 resumes its maximum value. With P 36 switched OFF release piston 54 goes down to its lower end position whereby branchline 52 may communicate with chamber 26 and the clamping force increases. The control verifies the maximum value of P 42 for confirming proper clamping. Thereafter P 42 is switched OFF by the control.

Thus, pneumatically driven chuck 1 may be driven by a software which originally had been created for running a spring driven chuck only. Moreover, chuck 1 clamps and unclamps reliably irrespective of the tool reference system with which chuck 1 is equipped.

Figure 10:
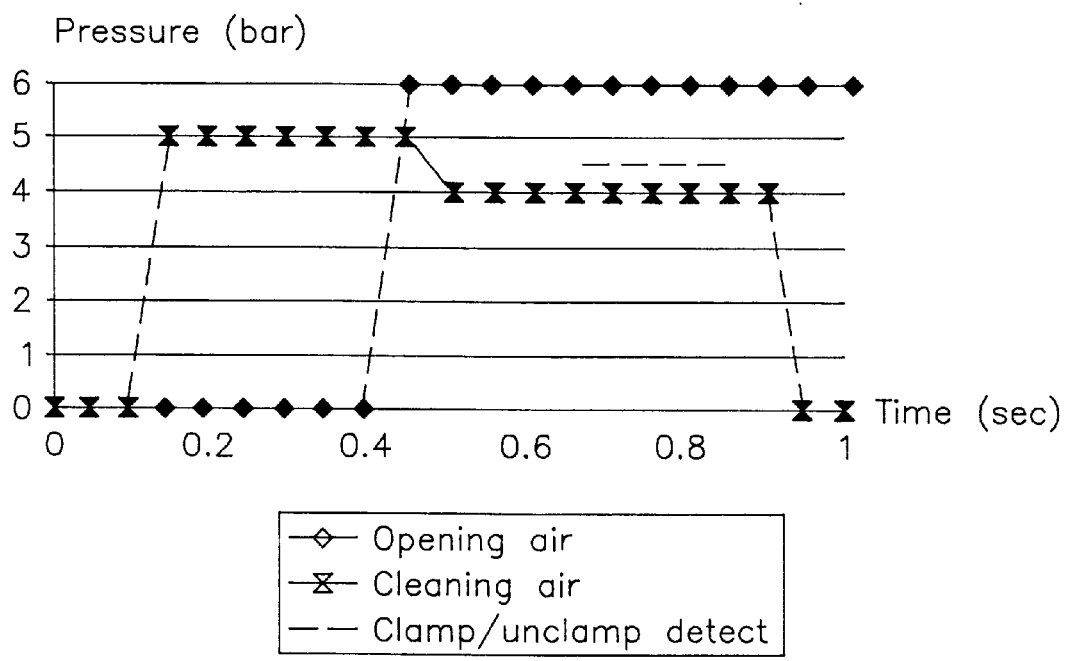
FIG. 10 a diagram similar to FIG. 6 for showing the opening sequence of the multireference chuck according to FIG. 8.
Figure 8:
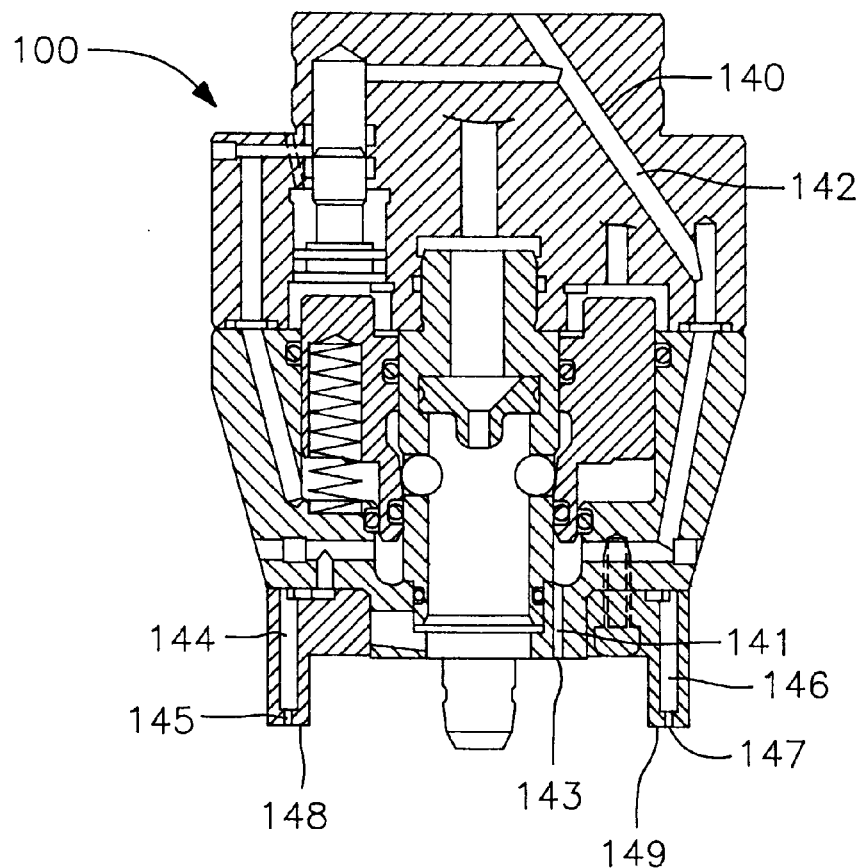
FIG. 8 a cross section like FIG. 2 of a multireference chuck.
Figure 9:
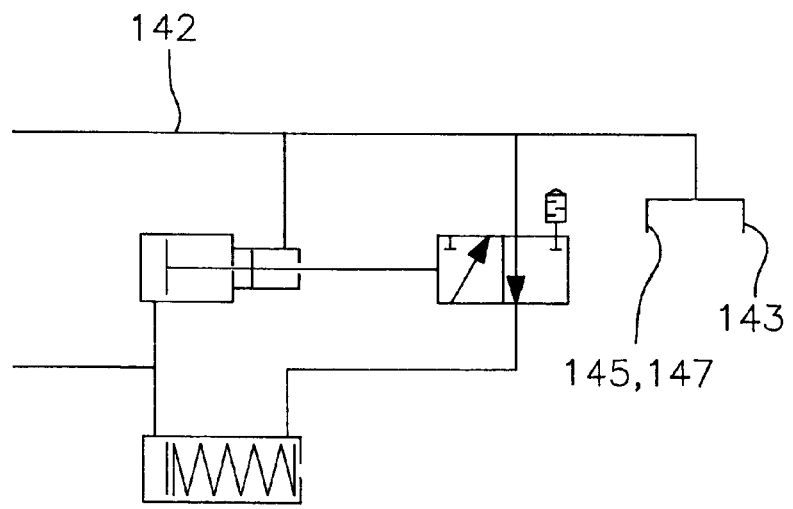
FIG. 9 a functional diagram similiar to FIG. 4 for the multireference chuck according to FIG. 8.
Figure 11:
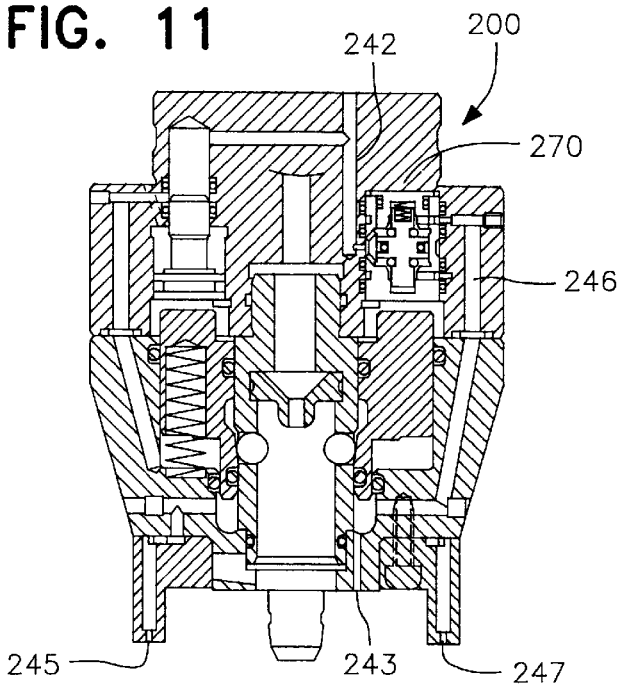
FIG. 11 a cross section like FIG. 2 of another embodiment of a multireference chuck.
Figure 12:
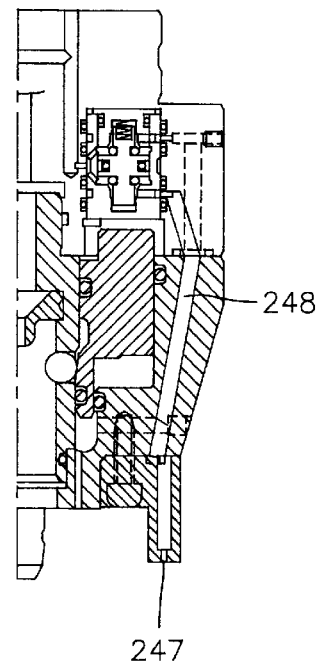
FIG. 12 one half of a cross section like FIG. 2 of the multireference chuck according to FIG. 11 taken along a vertical plane.
Figure 13:
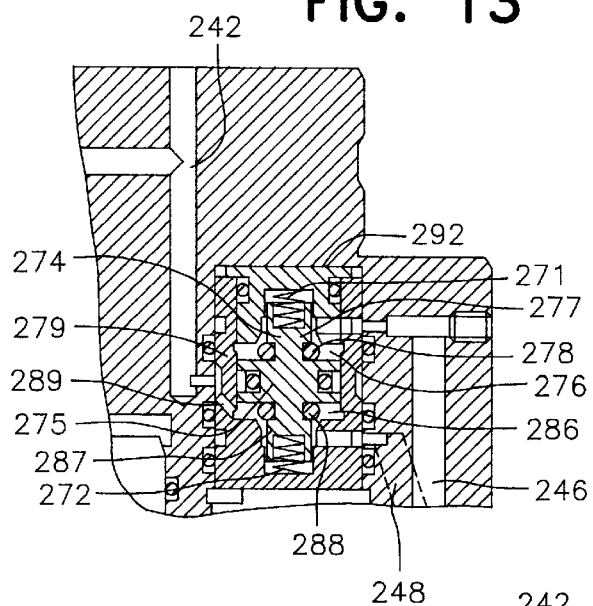
FIG. 13 a cross section like FIG. 2 in an enlarged scale of a closing valve built in the multireference chuck according to FIG. 11.
Figure 14:
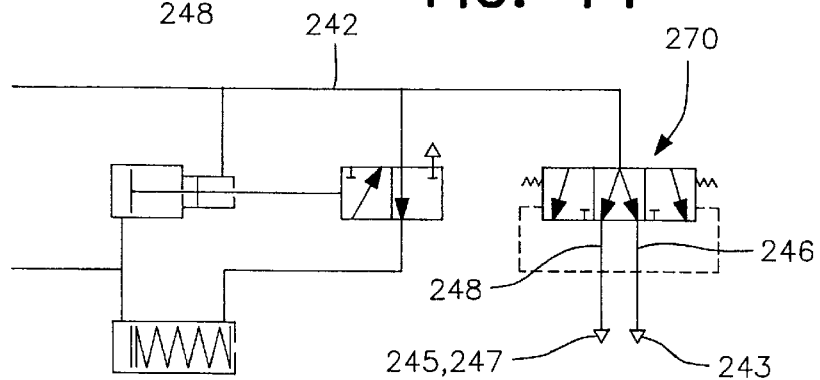
FIG. 14 a functional diagram similar to FIG. 4 for the multireference chuck according to FIG. 11.

The release valve 50 may also be built into a chuck like chuck 100 of FIG. 8 which is equipped with a first reference system and a second reference system different from the first one for clamping a workpiece having the first or the second reference system. The manifold 140 of cleaning air conduits includes a channel 142 which branches on one hand into four outlet channels 144, 146 (only two thereof are shown) each having an aperture 145, 147 in the associated z-reference surface 148, 149 of the reference system No. 1 and on the other hand into three outlet channels 141 (only one is shown) each having an aperture 143 in the associated z-reference surface of the reference system No. 2. Solely the magnitude of the cleaning air pressure P 142 is somewhat lower than that of P42 because upon clamping a workpiece of one of the reference systems the apertures of the outlet channels of the other reference system remain uncovered (see FIG. 10). Apart therefrom structure and function of the multireference system chuck 100 are identical to those of chuck 1. FIG. 9 depicts the functional mode of chuck 100 for clamping and unclamping. The reference system No. 1 may be that one disclosed in U.S. Pat. No. 4,855,558 and a reference system No. 2 is disclosed in U.S. patent application Ser. No. 08/571,793 now U.S. Pat. No. 5,791,803.

In yet another embodiment of the invention a multireference system chuck 200 according to FIGS. 11–14 is additionally equipped with a closing valve 270. It has a cleaning air input channel 242 and two cleaning air output channels 246 and 248. Output channel 246 connects to the three apertures 243 (only one is shown) in the z-reference surfaces of reference system No. 2. Output channel 248 leads to the four apertures 245, 247 (only two are shown) in the z-reference surfaces of system No. 1. Within a valve casing 292 a crosslike symmetrical closing piston 274 is floating and is held in a middle position between both opposite end positions by two opposite aligned counteracting springs 271, 272 each being housed in the closing piston 274 and abutting the adjacent wall of case 292. Above the disclike radial extension 275 extending transversely to the path of travel of closing piston 274 a first valve chamber 276 is provided from which output channel 246 extends. The upper stem 277 of closing piston 274 supports a sealing O-ring 278 which closes output channel 246 in the event the closing piston 274 moves sufficiently upwardly from its middle position towards the opening of output channel 246.

A similar arrangement is made below extension 275 symmetrically to the transverse center line thereof, the arrangement comprising a second valve chamber 286 from which output channel 248 extends and a sealing O-ring 288 supported by the lower stem 287 of closing piston 274. Thus, O-ring 288 closes output channel 248 in the event the closing piston 274 moves sufficiently downwardly from its middle position towards the opening of output channel 248.

The cleaning air channel 242 is connected to valve chamber 276 through a throttle valve 279 and is connected to the valve chamber 286 through a throttle valve 289. The function of the closing valve 270 is as follows: Assuming a workpiece is clamped in reference system No. 1 the three apertures 243 of system No. 2 remain uncovered whereas the four apertures 245, 247 of system No. 1 remain covered. Consequently the cleaning air pressure in output channel 246 and thus in valve chamber 276 is lower than the cleaning air pressure in output channel 248 and thus in valve chamber 286. As a result closing piston 274 moves towards output channel 246 such that it will be closed. No cleaning air will evade anymore from apertures 243.

Correspondingly, when a workpiece is clamped in reference system No. 2 cleaning air pressure in valve chamber 286 will be lower than in valve chamber 276 resulting in closing of output channel 248 by closing piston 274 in such a way that no cleaning air will evade from apertures 245, 247.

So closing valve 270 in multireference chuck 200 provides for automatic closing of apertures of a reference system to which a workpiece is not coupled while said workpiece is coupled in the different reference system without the necessity to alter or supplement the central control of the EDM and/or the programm running it. The program handles chuck 200 as if it would be a spring driven chuck. No air will escape into the electrolyte bath from a chuck like chuck 200 through the uncoverd apertures. Moreover, closing of closing valve 270 results in a higher pneumatic clamping force.

What is claimed is:

1. A pneumatically driven chuck for clamping and unclamping a tool holder of a machine tool, specifically an electric discharge machine, said chuck including a mechanical clamp for clamping said tool holder, a first air chamber for receiving opening air for releasing said mechanical clamp, a second air chamber for receiving cleaning air to provide pneumatic clamping of said tool holder, and a release valve in pneumatic communication with said first and second air chambers to release cleaning air pressure from said second air chamber when opening air is provided to said first chamber.

2. The chuck of claim 1 wherein said mechanical clamp includes a first piston having a front face and a back face, a spring biased against said back face to move said piston to a clamped position, said first air chamber adjacent said front face of said piston, said second air chamber adjacent said back face of the piston, wherein cleaning air pressure within said second air chamber provides an additive pneumatic clamping force to the spring force, and wherein opening air pressure within said first air chamber provides an opening force against the spring bias.

3. The chuck of claim 2 wherein said release valve includes a second piston, said second piston being movable to open and close a cleaning air line in communication with said second chamber wherein said second piston closes said cleaning air line when opening air pressure is within said first chamber.

4. The chuck of claim 3 wherein said second piston includes a first face in pneumatic communication with the cleaning air and a second face adjacent said first air chamber whereby the force acting on said second face by the opening air pressure in said first air chamber is greater than the force acting on said first face by the cleaning air pressure, causing said second piston to move to close said cleaning air line in communication with said second chamber.

5. The chuck of claim 1, wherein the release valve is adapted to vent the second air chamber when opening air pressure is provided to said first chamber.

6. The chuck of claim 1 having first reference surfaces defining a first reference in a first reference system for a tool having first reference elements of said first reference system the chuck further having second reference surfaces defining a second reference in a second reference system for a tool having second reference elements of said second reference system and a first cleaning air line and a second cleaning air line opening in the first reference surface and the second reference surface, respectively.

7. The chuck of claim 6 wherein a closing valve is provided for closing the first or the second cleaning air line under control of the cleaning air pressure when the first or second cleaning air line outlet is left uncovered after a tool having second or first reference elements is clamped to the chuck.

8. The chuck of claim 7 wherein the closing valve has a three position piston controlled by the cleaning air pressure difference of the first and the second cleaning air line such that the piston closes that one of the first and second cleaning air lines within which the lower cleaning air pressure is present after a tool has been effectively clamped to the chuck.

9. The chuck of claim 1 wherein the release valve is built into the body of the chuck.

10. The chuck of claim 7 wherein the closing valve is built in the body of the chuck.

\* \* \* \* \*